(12) United States Patent
Kaae et al.

(10) Patent No.: US 12,168,246 B2
(45) Date of Patent: Dec. 17, 2024

(54) DEVICE AND METHOD FOR PRODUCING FEED FOR LIVESTOCK

(71) Applicant: VESTJYLLANDS ANDEL A.M.B.A., Ringkøbing (DK)

(72) Inventors: Anders Kaae, Lemvig (DK); Torben Duedal Jensen, Brande (DK)

(73) Assignee: VESTJYLLANDS ANDEL A.M.B.A., Ringkobing (DK)

( * ) Notice: Subject to any disclaimer, the term of this patent is extended or adjusted under 35 U.S.C. 154(b) by 48 days.

(21) Appl. No.: 17/782,222

(22) PCT Filed: Dec. 1, 2020

(86) PCT No.: PCT/EP2020/084096
§ 371 (c)(1),
(2) Date: Jun. 3, 2022

(87) PCT Pub. No.: WO2021/110668
PCT Pub. Date: Jun. 10, 2021

(65) Prior Publication Data
US 2023/0023118 A1    Jan. 26, 2023

(30) Foreign Application Priority Data

Dec. 4, 2019   (EP) .................................... 19213390

(51) Int. Cl.
*B07B 1/40*   (2006.01)
*G01G 19/40*   (2006.01)

(52) U.S. Cl.
CPC .............. *B07B 1/40* (2013.01); *G01G 19/40* (2013.01); *B07B 2201/04* (2013.01)

(58) Field of Classification Search
CPC ...... G01G 19/40; B07B 1/40; B07B 2201/04; B07B 1/30; B07B 1/34
(Continued)

(56) References Cited

U.S. PATENT DOCUMENTS 3,250,207 A * 5/1966 Moyle .................. A23N 17/002
  241/78
3,304,991 A * 2/1967 Greenfield ................ C05F 7/00
  159/DIG. 25
(Continued)

FOREIGN PATENT DOCUMENTS

CN   107138433 A   9/2017
CN   207756053 U   8/2018
(Continued)

OTHER PUBLICATIONS

International Patent Application No. PCT/EP2020/084096; Int'l Search Report and the Written Opinion; dated Feb. 26, 2021; 14 pages.
(Continued)

*Primary Examiner* — Michael McCullough
*Assistant Examiner* — Jessica L Burkman
(74) *Attorney, Agent, or Firm* — BakerHostetler

(57) ABSTRACT

The invention relates to a device for determining particle size distribution in a bulk material, such as milled or grinded grain for animal feed. The device comprises an inlet for receiving at least a portion of the bulk material, a sorting mechanism for sorting the received bulk material. Said sorting mechanism comprises at least a first sorting device for sorting said received bulk material into at least two sorted partitions wherein the sorting device are capable of sorting different particle sizes and said at least two sorted partitions have different particle sizes. The invention further comprises a motor or actuator for vibrating said sorting device, a weighing system with at least one sensor for weighing the at least two sorted partitions sorted by said sorting mechanism and a data output for generating output data indicative of a weight of the at least two sorted partitions, so as to allow calculation of the particle size distribution in the bulk material received in the inlet and thus (Continued)

provide information regarding the particle size composition of the milled or grinded grain.

24 Claims, 6 Drawing Sheets

(58) Field of Classification Search
USPC .......................................................... 209/364
See application file for complete search history.

(56) References Cited

U.S. PATENT DOCUMENTS

| | | | | |
|---|---|---|---|---|
| 4,340,937 | A * | 7/1982 | Volk, Jr. ............... | A23N 17/005 |
| | | | | 425/DIG. 230 |
| 10,743,565 | B2 * | 8/2020 | Brion ..................... | A23K 10/33 |
| 10,791,869 | B2 * | 10/2020 | Al-Shaibani .............. | B07B 1/42 |
| 11,618,033 | B2 * | 4/2023 | Schneider ................ | B02C 9/04 |
| | | | | 241/9 |
| 2014/0166592 | A1 * | 6/2014 | Holton .................... | E21B 21/06 |
| | | | | 210/330 |
| 2018/0055289 | A1 | 3/2018 | Al Shaibani et al. | |
| 2021/0308721 | A1 * | 10/2021 | Haag ......................... | B07B 9/00 |

FOREIGN PATENT DOCUMENTS

| | | |
|---|---|---|
| CN | 108580257 A | 9/2018 |
| CN | 109862814 A | 6/2019 |
| GB | 2470075 A | 11/2010 |

OTHER PUBLICATIONS

European Patent Application No. 19213390.8; Extended Search Report; dated Jul. 1, 2020; 8 pages.
"VCS-600 Vibrating Calibration System"; Info Sheet; Hoopman Equipment & Engineering; one page.
"outotec psi® 500i Particle Size Analyzer"; Outotec; © 2019; 4 pages.
"Sortimat"; https://www.pfeffer.com/product/sortimat; Pfeuffer GmbH; © 2019; accessed Sep. 23, 2019; 3 pages.

* cited by examiner

DEVICE AND METHOD FOR PRODUCING FEED FOR LIVESTOCK

CROSS-REFERENCE TO RELATED APPLICATIONS

This application is the National Stage of International Patent Application No. PCT/EP2020/084096, filed Dec. 1, 2020, which claims the benefit of European Patent Application Number 19213390.8, filed Dec. 4, 2019, the disclosures of which are incorporated herein by reference in their entireties for any and all purposes.

FIELD OF THE INVENTION

The present invention relates to the production of feed for livestock, such as grain pellets and continuously monitoring the particle size composition of said feed. More specifically, the invention provides a device, system and method for measuring an adjusting the particle size of feed for livestock.

BACKGROUND OF THE INVENTION

For hundreds of years, grain has been used as feed, for humans and animals alike. The grain is typically processed by being milled or grinded into a feed with varying particle sizes and the feed can then be further processed/pressed into pellets, which are easy to handle for an animal caretaker and reduce the amount of dust, which are present when feeding the animals. The feed particle size refers to the average mean diameter of individual particles of feed or in other words, the fineness of the grinded feed. In recent years, studies have documented the importance of having the correct composition of particle sizes of the processed grain used for animal feed. If the particle size of the processed grain are too large, the animals does not digest the grains well and hence have a smaller energy uptake from the feed. If the particle size of the processed grains grain are too small there is an increased incidence of ulcers in pigs. Further, the dust from too small particle size in the feed may increase respiratory problems in the animals and cause dust build-up in any equipment in proximity of the feeding pits.

When feeding animals such as pigs, the desired particle size distribution of the feed is further dependent on the age of the animals which are fed. Hence, young piglets are advantageously fed with a finer grinded grain feed than older pigs.

Currently, the measurement of particle size distribution within animal feed production from grain is a manual process of sorting and measuring a partition of processed grain and calculating the distribution of particle sizes. The particle size distribution is dependent on the processing equipment, such as the hammer mill, grinder etc., the water percentage within the grain to be processed and the curing state of the grain. Thus, various parameters needs to be adjusted in the processing, in case a preferred particle size distribution in the resulting feed product is to be maintained.

Hence, an improved device for measuring the particle size of processed grain for animal feed would be advantageous. Further, a more efficient and/or reliable device, system and method of controlling and adjusting the particle size continuously during processing of animal feed would be advantageous. The improved system may be used to produce a range of feeding products with varying particle size distributions, which are suitable for different animals and animals of different age, so as to optimize the feeding of said animals.

SUMMARY OF THE INVENTION

Thus, according to the above description, it may be seen as an object of the present invention to provide a device, system and method for measuring and thus allow adjusting of the particle size composition of processed grain, such as milled or grinded grain for use in animal feed, either as a bulk grain material or as pressed grain pellets.

In a first aspect, the invention provides a device for determining particle size distribution in a bulk material, said device comprising:
- an inlet for receiving at least a portion of the bulk material,
- a sorting mechanism for sorting the received bulk material, said sorting mechanism comprising:
- at least a first sorting device for sorting said received bulk material into at least two sorted partitions wherein the sorting device are capable of sorting different particle sizes and said at least two sorted partitions have different particle sizes,
- a motor or actuator for vibrating said sorting device,
- a weighing system comprising at least one sensor for weighing the at least two sorted partitions sorted by said sorting mechanism and a data output for generating output data indicative of a weight of the at least two sorted partitions, so as to allow calculation of the particle size distribution in the bulk material received in the inlet.

Such a device for measuring the particle size of a bulk material is advantageous, as the weight data provided from the data output can be used for analysis of the current particle size distribution of the bulk material which are fed into the inlet. Such detailed weight data can be used for either generating an immediate picture of a portion of a bulk material or for generating a continuous analysis of the weight data in a continuous process of sorting bulk material and generating running means of bulk material being sorted in the device, so as to continuously ensure a desired particle size composition.

The weight data may be used as a quality control of the bulk material and/or to document the particle size distribution of a bulk material, either in a continuous process or in a batch process.

In a case where the device is used to measure the particle size of a batch of bulk grain material suitable for animal feed, the output data indicative of the weight of the sorted partitions may be used to label said batch of bulk grain material and hence, document to an animal caretaker that the feed has a particle size distribution which is suitable for the desired feeding purpose.

In the context of the present invention, particle size is to be understood as the average mean diameter of individual particles within a set or subset, such as a sorted partition.

The sorting mechanism is suitable for sorting particles of different sizes, such as, but not limited to, sorting particles into partitions or groups of particles which have an average mean diameter of >5 mm, another group of particles which have an average mean diameter of >4 mm, another group of particles which have an average mean diameter of >3 mm, another group of particles which have an average mean diameter of >2 mm, another group of particles which have an average mean diameter of >1 mm, another group of particles which have an average mean diameter of >0.5 mm, another group of particles which have an average mean diameter of >0.1 mm and a group of particles which have an average mean diameter of <0.1 mm.

In a preferred embodiment, the sorting mechanism comprises three sorting devices so as to sort particles into four partitions, a first partition having an average mean diameter of >3 mm, a second partition having an average mean diameter of between 3 mm and 2 mm, a third partition having an average mean diameter of between 2 mm and 1 mm and a fourth partition having an average mean diameter of <1 mm. Said sorting devices are preferably sieves. This particular embodiment have proven to be suitable for assessing the particle composition of feed, such as grain feed for pigs or other animals.

In the context of the present invention, bulk material is to be understood as a material, which comprises numerous smaller items, such as a quantity of grains transported to the present invention, to be processed and sorted, from a suitable storage container, such as a grain silo.

In the context of the present invention, a motor or actuator is to be understood as a device suitable for generating vibrations within an industrial application and vibrations are to be understood as motions performed in two or more directions subsequent to each other, such as motions in two opposite directions in an x axis in a plane or such as alternating motions in an x and y axis on a plane or such as alternating motions in an x and y axis on a plane combined with motions in a z axis perpendicular to said plane.

In an embodiment, the device comprises at least a second sorting device wherein the second sorting device receives bulk material from the first sorting device in order to sort the bulk material to be sorted into at least three partitions. This embodiment is advantageous, when there is a need to describe the particle size distribution of a bulk material in more detail, than in two different particle sizes, such as to describe the particle size distribution in a bulk material based on the weight on three, four or more sorted particle sizes.

In another embodiment, the device is arranged inside a frame or housing comprising a top portion and a bottom portion, the device further being horizontally arranged with the inlet at the top portion, the first sorting device positioned below the inlet for receiving bulk material from the inlet, the second sorting device positioned below the first sorting device for receiving bulk material from the first sorting device and wherein the particle size of the bulk material received in the second sorting device is smaller than the particle size of the sorted portion, sorted by the first sorting device. This embodiment is advantageous for an industrial application, as the horizontal arrangement saves space. Furthermore, it is easy to maintain and service the different aspects of the device from the side of the device. Further, when sorting particles, particles having a mass, gravity can be used to enable sorting by letting particles which are small enough to go through a first sorting device, fall downwards. The downwards falling of particles may be used when arranging a next sorting device, such as by placing the next sorting device directly below the first sorting device. A horizontal arrangement also ensures that most of the material to be sorted ends up at the bottom of the device, for easy outlet of bulk material, which have been sorted.

In the context of the present invention, it is to be understood that a housing could be a sealed housing with maintenance and operating hatches, so as to prevent any dust which may be air-launched by vibrations inside the device, to move outside the housing so as to settle on equipment in proximity of the device or enter the airways of operators of the device.

In yet another embodiment, the sensor of the weighing system is positioned at a bottom portion of the device and the bulk material to be sorted is weighed at the bottom portion of the device so as to use gravity for easing the downwards motion of the sorted particles through the device.

In a preferred embodiment, the at least two sorting devices comprise respective first and second sieves, wherein the bulk material is translated from the first sieve to the second sieve through vibration of said first and second sieves, the holes in the first sieve being larger than the holes in the second sieve, so as to allow particles smaller than the particles kept in the first sieve to translate from the first sieve to the second sieve. In this embodiment, the sieves is a simple, yet effective method of sorting a bulk material into at least a first and second partition having different particle sizes. Further, the sieves are easy to maintain and/or replace with sieves with different hole sizes, should there be a need to sort bulk material into other particle sizes than what has been done previously.

In another embodiment, the weighing system comprises a plurality of weighing sensors for weighing respective ones of the at least two partitions, so as to have a fast analysis of the particle size distribution. In an advantageous embodiment, the inlet also comprises a weighing sensor, so as to measure the weight of the bulk material of a batch to be sorted and to ensure correlation between the bulk material to be sorted and the sum of sorted partitions. This is particularly advantageous to ensure and document the quality of the analysis performed by the device.

In a preferred embodiment, the device further comprises individual containers in connection to each of the sorting devices, for receiving the sorted partitions from the sorting devices. This embodiment is advantageous when sorting small batches of bulk material representative of a greater batch, being processed, in which the smaller sorted batch is not necessarily sent back into a processing system.

In an advantageous embodiment, the sorting device(s) is/are angled downwards, relative to a horizontal plane, towards the container so as to translate any particles kept in the respective sorting device towards said container through vibration. This embodiment is advantageous, as it utilizes the simplicity of gravity in combination with the angle of the sorting device and the vibration of the sorting devices to transport any particles which are too large to move through a sorting device, forwards, such as towards a container or a transport device to transport said particles towards a next stage in a processing system.

In a preferred embodiment, a chute is positioned below the downwards angled sorting device(s) and said chute is angled downwards, at an angle substantially opposite to the sorting device(s) angle, relative to a horizontal plane so as to ensure that all particles which are too small to reach the downward facing end of the sorting device ends up on said chute, slides in the opposite direction towards an upper end of a next sorting device at which point the sorting process repeats itself. This embodiment is advantageous for ensuring that bulk material to be sorted translates through the whole length of each sorting device. If a particle is too large to fall through a sorting device, it will not reach the chute positioned below said sorting device but will instead reach the end of said sorting device and end up in a container, or on a transport device or fall downwards, due to gravity, pass the chute below and end up at a next processing stage.

In another embodiment, the device further comprises a cleaning mechanism for discarding the sorted partitions and cleaning the sorting mechanism, said cleaning mechanism comprising: a controller, containers attached to each of the sorting devices, tilting mechanisms attached to each of the containers, a motor, at least one cleaning unit mechanically connected to said motor, such as a brush, an outlet, wherein the controller activates the tilting mechanism to tilt the containers and discard the sorted partitions to the outlet after which the cleaning unit cleans the sorting devices after the sorted partitions have been discarded from said sorting devices. This embodiment is particularly advantageous for integrating the device into a fully automated processing system wherein an operator is not needed to ensure that all particles from a batch of bulk material to be sorted, is removed from the device before sorting a next batch of bulk material.

In a preferred embodiment, the sorting mechanism comprises an individual motor or actuator for vibrating each of the sorting devices, so as to enable the sorting devices to vibrate at different frequencies. This embodiment is particularly advantageous for sorting bulk material which tend to generate dust when vibrated, ensuring that the smallest particles are not air-launched as a result of too fast vibrations and hence avoid an excessive generation of dust in the proximity of the device and/or inside the device which typically requires cleaning and maintenance.

In yet another preferred embodiment of the device, the motor(s) or actuator(s) vibrate the sorting device(s) at between 0.5 and 30 Hz, preferably between 1 and 20 Hz and most preferably between 4 and 10 Hz.

In an embodiment of the device, a first sorting device vibrates at a higher frequency than any subsequent sorting devices.

In another embodiment of the device, a first sorting device vibrates at a lower frequency than any subsequent sorting devices.

In an advantageous embodiment, the device further comprises imaging means, such as a camera or CCD sensor, a 3D scanner or line scanner wherein the imaging means are suitable for detecting color variance, size variance and/or reflectance of bulk material, either prior to and/or during and/or after sorting of said bulk material. This embodiment is particularly advantageous for detecting anomalies within the bulk material, such as foreign objects or objects of a size, color or reflectance other than desired. As an example, the imaging means may detect portions of a foreign object, such as particles made or plastic within a bulk material made from grain. The imaging means may further be connected to a controller, which outputs a signal, notifying an operator to the presence of the detection of one or more foreign objects within the bulk material or automatically discarding said foreign objects, such as by discarding a portion of the bulk material wherein said foreign objects have been detected.

In the context of the present invention, anomalies is to be understood as any structure, function, or state outside the usual range of variation from the norm.

In the context of the present invention, reflectance is to be understood as the measure of the proportion of light or other radiation striking a surface which is reflected off of it.

In a preferred embodiment, the device further comprises suction means for removing aerosolized particles from the environment surrounding the sorting device. This embodiment is particularly advantageous for removing any particles from the environment, which may otherwise contaminate or pollute any elements peripheral to, or within the location of the sorting device, such as equipment or goods. This embodiment is further advantageous for securing a safe working environment for subjects, such as an operator, which works or moves through an area where the device is positioned.

In the context of the present invention, aerosolized is to be understood as the suspension of particles within the air, such as dust particles being suspended in the air for minutes or hours.

In yet another advantageous embodiment, the device comprises a vibration sensor configured for detecting vibrations of bulk material being sorted, such as a microphone or a piezoelectric sensor. The vibration sensor is particularly advantageous for detection of unexpected size variation of the bulk material within the sorting mechanism. The vibration sensor may be configured to detect any particles which are larger than a set threshold, by detecting the vibrations from said larger particles during sorting. A microphone may be configured to obtain sound frequencies generated during sorting and detect specific sound frequencies generated by said larger particles. The vibration sensor may further be configured to send a signal to a peripheral device, such as a computational device, or an operator, as a response to the detection of the larger particles.

In a second aspect, the invention relates to a processing system comprising the device according to the first aspect of the invention and a computer system for receiving data from the data output which may be indicative of the weight of the at least two sorted partitions of bulk material, so as to allow calculation of the particle size distribution in the bulk material received in the inlet.

In the context of the present invention, it is to be understood that the calculation may be performed by weighing each of the sorted partitions of the bulk material and calculate their respective weight percentages relative to the total weight of the bulk material, which were sorted by the device. When the weight percentage of the partitions are calculated and the particle sizes of the partitions are known it is possible to calculate the particle size distribution of a subset of a batch, it is possible to estimate the particle size distribution of a said batch, given that the subset of the batch is representative of the batch as a whole.

In a preferred embodiment, the processing system has a particle size distribution target range of a milled bulk material with a plurality of processing stages, said processing system comprising:

a mill/grinder for milling/grinding a bulk material, said bulk material having a first particle size and the milled bulk material having at least a second particle size wherein the at least second particle size is smaller than the first particle size, a transporting device for transporting the milled bulk material to the device for determining particle size distribution in said milled bulk material according the first aspect of the invention, wherein the particle size distribution target of the milled bulk material is maintained by, when said particle size distribution is not within said particle size distribution target, adjusting one or more operational parameters of the mill, based on the particle size distribution data of the milled bulk material and wherein the mill/grinder and the device for determining particle size distribution are only two of more stages in said processing system. The invention is particularly advantageous for automating the process of continuously adjusting the particle size of the bulk material which is milled/grinded, such as in a first stage of processing grains for animal feed in which as specific particle size distribution is required. A further advantage is the possibility of monitoring whether a particle size distribution changes during either a change of bulk material provided to the mill/grinder or due to other factors, such as worn equipment which may warrant maintenance. Thus, the invention enables a higher consistency and thus quality of the processed bulk material, relative to the use of said processed bulk material.

In an embodiment of the invention, the operational parameters of the mill/grinder can be one or more of adjusting the revolution speed of the mill, changing the hole size of the riddle, or adding a second bulk material so as to adjust the composition of the bulk material which are fed into the mill. This is particularly advantageous as the processing of bulk material requires more than one method of adjusting particle size in order to maintain a consistent high quality product with a specific particle size composition so as to be less dependent on a consistent starting material. If the bulk material to be processed, such as grain changes in water content during a continuous process, the particle size distribution of the processed grain would expect to change, at which point the processing system would detect a change in particle size distribution and adjust one or more of the above-mentioned parameters.

In the context of the present invention, a riddle is to be understood as a coarse sieve usually present in a mill or grinder for processing grains, such as for separating grain from chaff.

In another embodiment, sorted bulk material is transferred back into the bulk material processing system at a stage of the processing system, which is positioned after the device for determining particle size distribution has sorted and weighed said milled/grinded bulk material received from the inlet, so as to further process said sorted bulk material. This invention is particularly advantageous for the continuous controlling and adjusting the particle size distribution of processed bulk material, in which continuous monitoring of said particle size distribution does not cause waste of bulk material which has been sorted and weighed, but instead ensured that said sorted and weighed bulk material is fed back into the processing system and thus ends up as a finished product, such as animal feed.

In yet another embodiment, the processing system further comprises a pellet presser for pressing the milled/grinded bulk material into pellets, said pellets having a specific particle size composition based on the calculated particle size distribution data of the milled/grinded bulk material.

In a third aspect, the invention relates to a method of measuring particle size distribution in a bulk material, said method comprising the steps of:
  receiving at least a portion of the bulk material at an inlet
  sorting the received bulk material with a sorting mechanism, said sorting mechanism comprising:
    at least a first sorting device for sorting said received bulk material into at least two sorted partitions wherein the sorting device are capable of sorting different particle sizes and said at least two sorted partitions have different particle sizes,
    a motor or actuator for vibrating said sorting device,
  providing a weighing system comprising at least one sensor for weighing the at least two sorted partitions sorted by said sorting mechanism,
  providing data output for generating output data indicative of a weight of the at least two sorted partitions, and
  calculating the particle size distribution in the bulk material received in the inlet based on the provided data output.

In a preferred embodiment the method of controlling the particle size distribution target range of the milled bulk material, when the milled bulk material is not within said target range, further comprises one or more of the following:
  adjusting a revolution speed of the mill,
  changing a hole size of a riddle, and/or
  adding a second bulk material so as to adjust the composition of the bulk material which are fed into the mill.

In a more preferred embodiment, the method of producing pellets with a specific particle size distribution further comprises the steps of:
  providing a press for pressing pellets from a bulk material,
  pressing the milled bulk material into pellets suitable for animal feed.

In a fourth aspect, the invention provides a method for producing animal feed from grain, the method comprising
  milling the grain,
  applying the method according to the third aspect to a portion of the grain, and
  producing animal feed from the grain, such as pellets.

The first, second, third, and fourth aspect of the present invention may each be combined with any of the other aspects. These and other aspects of the invention will be apparent from and elucidated with reference to the embodiments described hereinafter.

BRIEF DESCRIPTION OF THE FIGURES

The device, system and method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
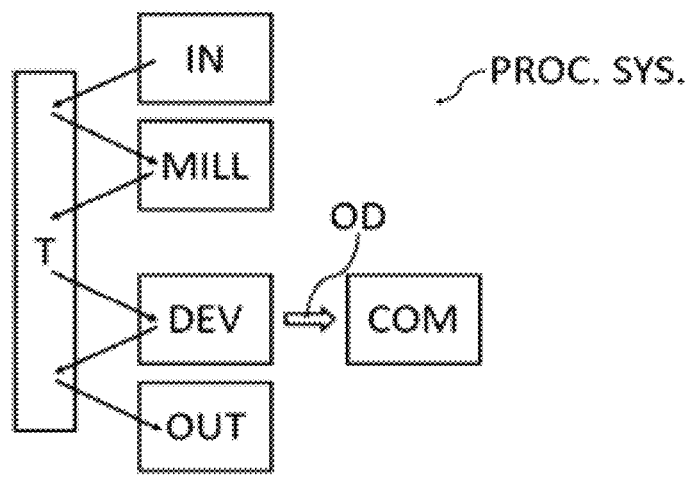
FIG. 1 is a schematic overview of an embodiment of a processing system.

FIG. 1 is a schematic overview of an embodiment of a processing system PROC. SYS. for processing a bulk material, such as processing grain into animal feed. FIG. 1 has an inlet IN for receiving a bulk material, such as grain. From the inlet IN, the bulk material is transferred to a transporting means T so as to transport the bulk material to a mill MILL so as to mill or grind the bulk material into a milled or grinded bulk material. From the mill MILL, the milled or grinded bulk material is transferred back to the transporting means T, and transported to a device for determining particle size distribution DEV of said milled or grinded bulk material. The device DEV outputs data OD to a computer COM, said output data OD comprising information regarding the particle size distribution of the milled or grinded bulk material or at least data indicating weight of different portions of the grinded bulk material sorted into portions of different particle sizes, thus allowing calculation of particle size distribution by the computer COM. The milled or grinded bulk material are then transferred from the device DEV to the transporting means T, from where the processed bulk material, such as bulk animal feed, can be transported to an output OUT.

Alternatively, only a portion of the grinded bulk material from the mill MILL, e.g. controlled by a valve system, so as to manually or automatically controlling the valve system to guide a portion of grinded bulk material from the mill MILL to the device DEV for determining particle size distribution of a sample of the grinded bulk material. Thus, only a limited portion, such as 1-10 kg, of the grinded bulk material can be guided to the inlet of the device DEV.

It is to be understood that the output OUT mentioned in the embodiment of FIG. 1 may be such as a packaging device for packaging batches of processed bulk material, such as into packages of animal feed.

Figure 2:
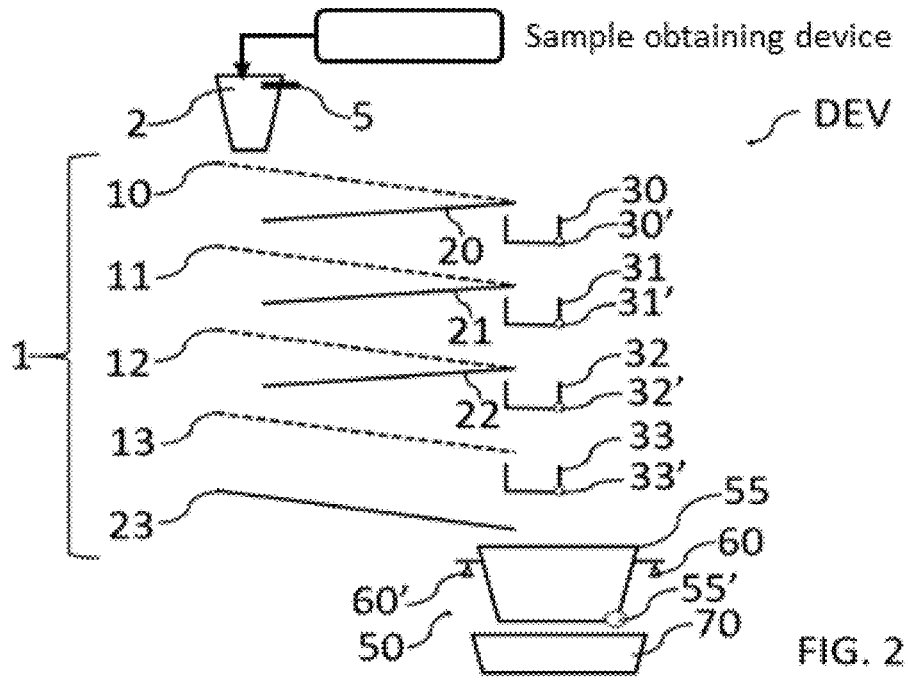
FIG. 2 is a schematic overview of an embodiment of the device for determining particle size distribution.

FIG. 2 is a schematic overview of an embodiment of the device for determining particle size distribution DEV of a bulk material, such as the particle size distribution of milled or grinded grain for animal feed. The embodiment comprises an inlet 2 at the top of the device DEV. A sensor 5, is positioned on the inlet 2. Below the inlet 2, a sorting mechanism 1 is positioned. The sorting mechanism comprises a first sorting device 10 which is positioned below the inlet 2 in an oblique position, relative to a horizontal axis. At the lower end of the first sorting device 10, below said first sorting device 10, a first container 30 is positioned. Said first container 30 comprises a hinge or tilting mechanism 30'. Directly below the first sorting device 10, a first chute or sliding means 20 is positioned in an oblique position, relative to a horizontal axis, at an inclination substantially opposite to the first sorting device 10, so as to have opposite ends oriented upwards and downwards, relative to the first sorting device 10. Below the first chute 20, a second sorting device 11 is positioned in an oblique position, substantially parallel to the first sorting device 10. At the lower end of the second sorting device 11, below said second sorting device 11, a second container 31 is positioned. Said second container 31 comprises a hinge or tilting mechanism 31'. Directly below the second sorting device 11, a second chute or sliding means 21 is positioned in an oblique position, substantially parallel to the first chute 20. Below the second chute 21, a third sorting device 12 is positioned in an oblique position, substantially parallel to the first and second sorting devices 10, 11. At the lower end of the third sorting device 12, below said third sorting device 12, a third container 32 is positioned. Said third container 32 comprises a hinge or tilting mechanism 32'. Directly below the third sorting device 12, a third chute or sliding means 22 is positioned in an oblique position, substantially parallel to the first chute and second chute 20, 21. Below the third chute 22, a fourth sorting device 13 is positioned in an oblique position, substantially parallel to the first, second and third sorting devices 10, 11, 12. At the lower end of the fourth sorting device 13, below said fourth sorting device 13, a fourth container 33 is positioned. Said fourth container 33 comprises a hinge or tilting mechanism 33'. Directly below the fourth sorting device 13, a fourth chute or sliding means 23 is positioned in an oblique position, substantially parallel to the first chute, second and third chute 20, 21, 22. Below the fourth chute or sliding means 23, a weighing system 50 is positioned, said weighing system 50 comprising a weighing container 55 attached to sensors 60, 60' for weighing the weighing container 55. The weighing container 55 has a hinge or tilting mechanism 55'. Below the weighing system 50, a bottom container 70 is positioned.

It is further to be understood, that the embodiment illustrated in FIG. 2 may have more or less sorting devices than illustrated, for sorting a bulk material into more or less containers, such as, but not limited to:
one sorting device for sorting a bulk material into two partitions,
two sorting devices for sorting a bulk material into three partitions,
three sorting devices for sorting a bulk material into four partitions,
four sorting devices for sorting a bulk material into five partitions,
five sorting devices for sorting a bulk material into six partitions or
six sorting devices for sorting a bulk material into seven partitions.

Figure 3:
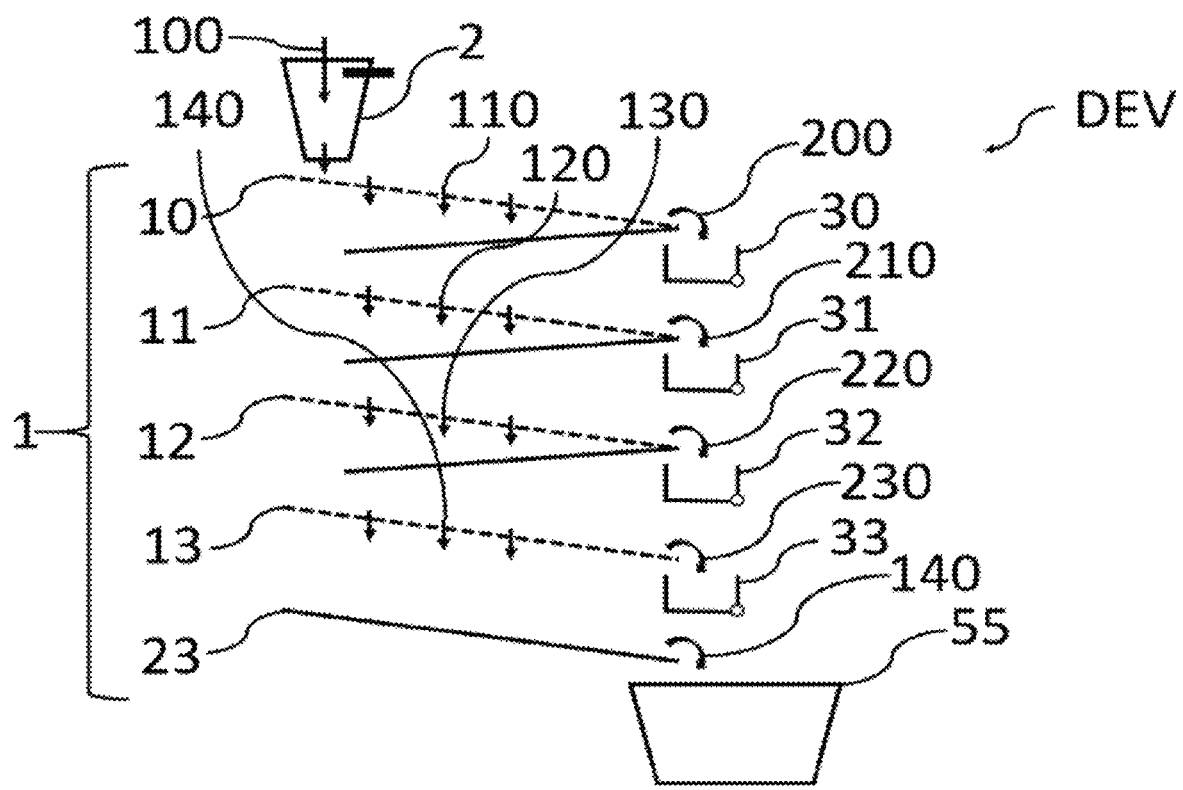
FIG. 3 is another schematic overview of an embodiment of the device for determining particle size distribution.

FIG. 3 is another schematic overview of an embodiment of the device for determining particle size distribution DEV of a bulk material 100, such as the particle size distribution of milled or grinded grain for animal feed. The embodiment comprises an inlet 2 at the top of the device DEV, for receiving the bulk material 100. The bulk material 100 is transferred from the inlet 2 to the sorting mechanism 1, and is sorted into a first sorted bulk material 200, with a first sorting device 10. The bulk material 100 is sorted into a first sorted bulk material 200, which is not able to pass through the first sorting device 10, and a first residual bulk material 110, which passes through the first sorting device 10. The first sorted bulk material 200, which do not pass through the first sorting device 10, is transported to a first container 30. A second sorting device 11 receives the first residual bulk material 110 to sort said first residual bulk material 110 into a second sorted bulk material 210, which is not able to pass through the second sorting device 11, and a second residual bulk material 120, which passes through the second sorting device 11. The second sorted bulk material 210, which do not pass through the second sorting device 11, is transported to a second container 31. A third sorting device 12 receives the second residual bulk material 120 to sort said second residual bulk material 120 into a third sorted bulk material 220, which is not able to pass through the third sorting device 12, and a third residual bulk material 130, which passes through the third sorting device 12. The third sorted bulk material 220, which do not pass through the third sorting device 12, is transported to a third container 32. A fourth sorting device 13 receives the third residual bulk material 130 to sort said third residual bulk material 130 into a fourth sorted bulk material 230, which is not able to pass through the fourth sorting device 13, and a fourth residual bulk material 140, which passes through the fourth sorting device 13. The fourth sorted bulk material 230, which do not pass through the fourth sorting device 13, is transported to a fourth container 33. The fourth chute or slide 23 receives the fourth residual bulk material 140 and transfers said fourth residual bulk material 140 to the weighing container 55.

It is to be understood that the first sorted bulk material 200, the second sorted bulk material 210, the third sorted bulk material 220, the fourth sorted bulk material 230 and the fourth residual bulk material represent five sorted partitions of the bulk material 100 and that the five sorted partitions of the bulk material 100 is characterized in that they have substantially different particle sizes, relative to each other.

In a specific embodiment for sorting five partitions, a first partition may have a particle size above 5 mm, more specifically a particle size above 3 mm, a second partition may have a particle size of between 1 mm and 4 mm, more specifically between 2 mm and 3 mm, a third partition may have a particle size of between 0.5 mm and 3 mm, more specifically between 1 mm and 2 mm, a fourth particle size of between 0.1 mm and 1 mm, more specifically between 0.3 mm and 0.4 mm and a fifth partition with particle sizes below the particle size of the fourth partition, such as a particle size below 0.35 mm.

Figure 4:
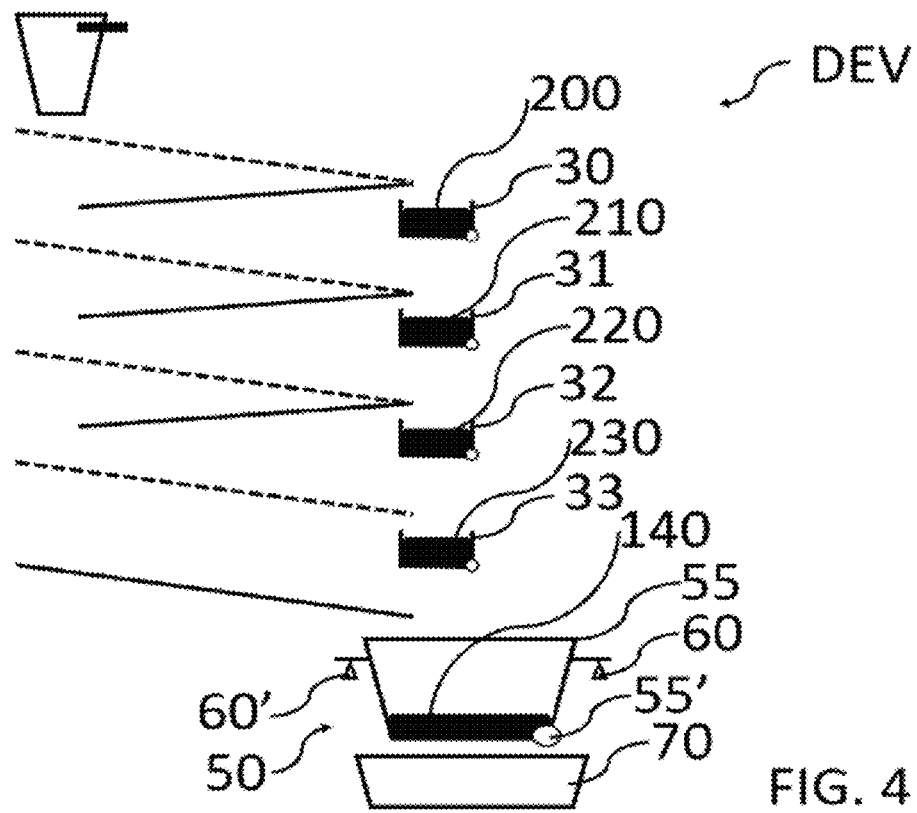
FIG. 4 is another schematic overview of an embodiment of the device for determining particle size distribution.

FIG. 4 is another schematic overview of an embodiment of the device for determining particle size distribution DEV of a bulk material 100, such as the particle size distribution of milled or grinded grain for animal feed. The embodiment shows how, after the device DEV have sorted the bulk material to be sorted, the first container 30 contains the first sorted bulk material 200, the second container 31 contains the second sorted bulk material 210, the third container 32 contains the third sorted bulk material 220, the fourth container 33 contains the fourth sorted bulk material 230 and the weighing container 55 contains the fourth residual bulk material 140. The weighing container 55 is a part of the weighing system 50, which further comprises sensors 60, 60' attached to the weighing container 55, for weighing said weighing container 55. The weighing container 55 has a hinge or tilting mechanism 55' for emptying, after weighing, the fourth residual bulk material 140 into the bottom container 70, which is positioned below the weighing container 55.

Figure 5:
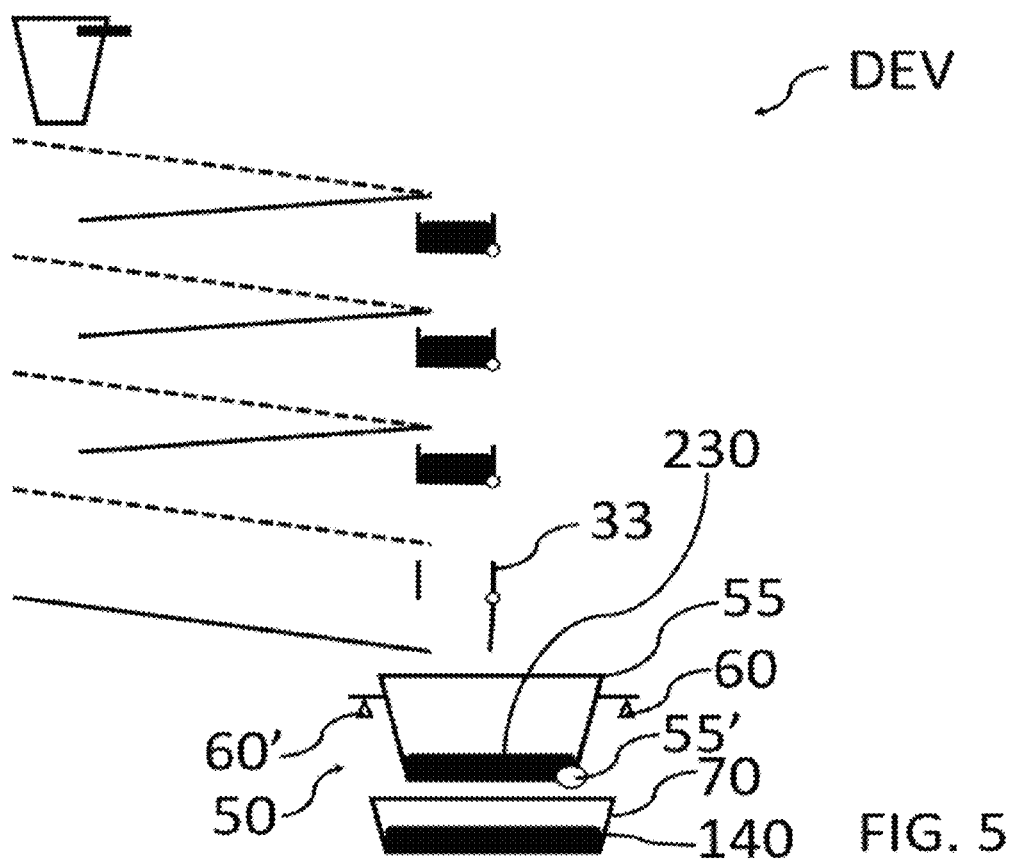
FIG. 5 is another schematic overview of an embodiment of the device for determining particle size distribution.

FIG. 5 is another schematic overview of an embodiment of the device for determining particle size distribution DEV of a bulk material 100, such as the particle size distribution of milled or grinded grain for animal feed. FIG. 5 shows the weighing system 50, while weighing the fourth sorted bulk material 230. The fourth sorted bulk material 230 has been emptied from the fourth container 33, into the weighing container 55, which, by use of the sensors 60, 60' can measure the weight of said fourth sorted bulk material 230. FIG. 5 further shows the fourth residual bulk material 140 being contained in the bottom container 70.

It is to be understood that the weighing system 50, is able to weigh each of the sorted partitions individually, by, after weighing one partition in the weighing container 55, to empty said partition into the bottom container 70, after which another sorted partition can be emptied into the weighing container 55 from one of the containers 30, 31, 32 or 33 respectively.

Figure 6:
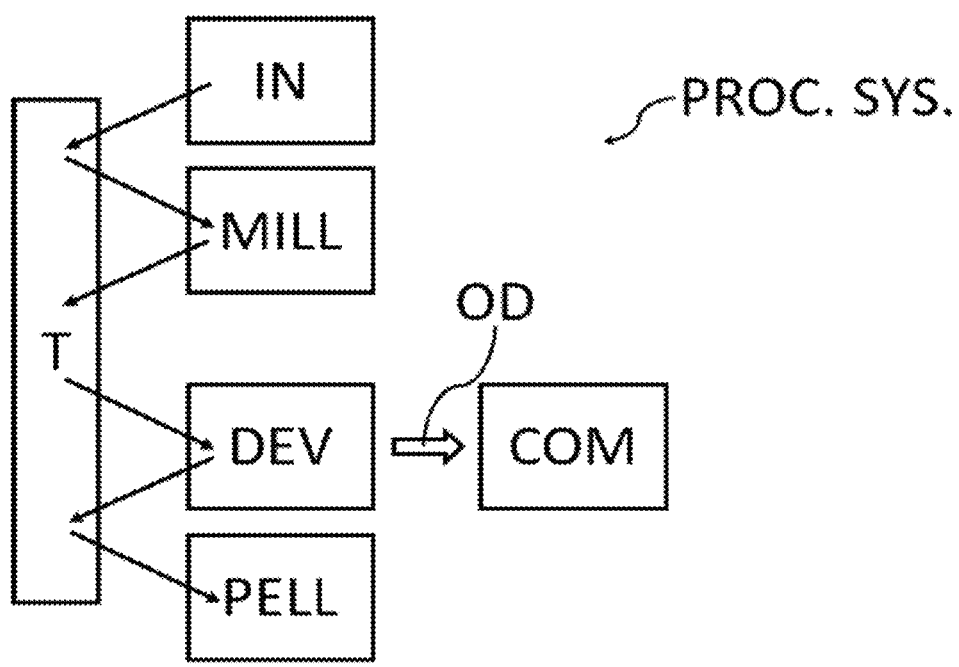
FIG. 6 is a schematic overview of another embodiment of a processing system.

FIG. 6 is a schematic overview of an embodiment of a processing system PROC. SYS. for processing a bulk material, such as processing grain into animal feed pellets. The system PROC. SYS. has an inlet IN for receiving a bulk material, such as grain. From the inlet IN, the bulk material is transferred to a transporting means T so as to transport the bulk material to a mill MILL so as to mill or grind the bulk material into a milled or grinded bulk material. From the mill MILL, the milled or grinded bulk material is transferred back to the transporting means T, and transported to a device for determining particle size distribution DEV of said milled or grinded bulk material. The device DEV outputs data OD to a computer COM, said output data OD comprising information regarding the particle size distribution of the milled or grinded bulk material. The milled or grinded bulk material are then transferred from the device DEV to the transporting means T, from where the processed bulk material, such as bulk animal feed, can be transported to a pellet processing means PELL so as to press the processed bulk material into pellets, such as pellets suitable for animal feed.

Figure 7:
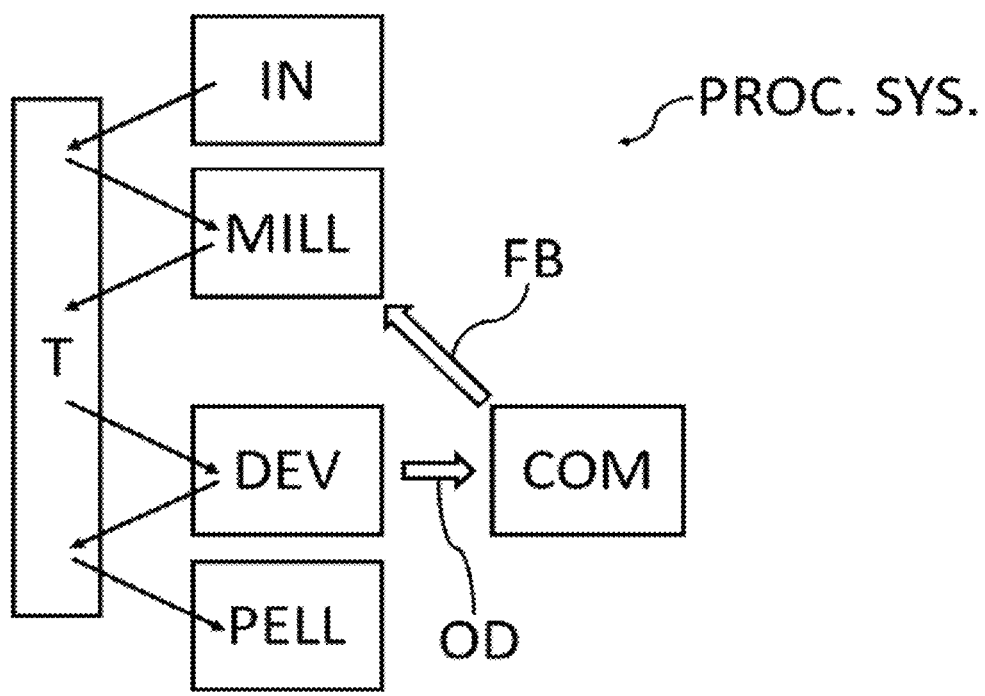
FIG. 7 is a schematic overview of another embodiment of a processing system.

FIG. 7 is a schematic overview of an embodiment of a processing system PROC. SYS. for processing a bulk material, such as processing grain into animal feed. The system PROC. SYS. has an inlet IN for receiving a bulk material, such as grain. From the inlet IN, the bulk material is transferred to a transporting means T so as to transport the bulk material to a mill MILL so as to mill or grind the bulk material into a milled or grinded bulk material. From the mill MILL, the milled or grinded bulk material is transferred back to the transporting means T, and transported to a device for determining particle size distribution DEV of said milled or grinded bulk material. The device DEV outputs data OD to a computer COM, said output data OD comprising information regarding the particle size distribution of the milled or grinded bulk material. The computer COM can use the information regarding the particle size distribution of the milled or grinded bulk material to adjust the mill MILL, so as to adjust the particle size distribution of the milled or grinded bulk material, by sending a feedback signal FB to the mill MILL. The milled or grinded bulk material are transferred from the device DEV to the transporting means T, from where the processed bulk material, such as bulk animal feed, can be transported to a pellet processing means PELL so as to press the processed bulk material into pellets, such as pellets suitable for animal feed.

Figure 8:
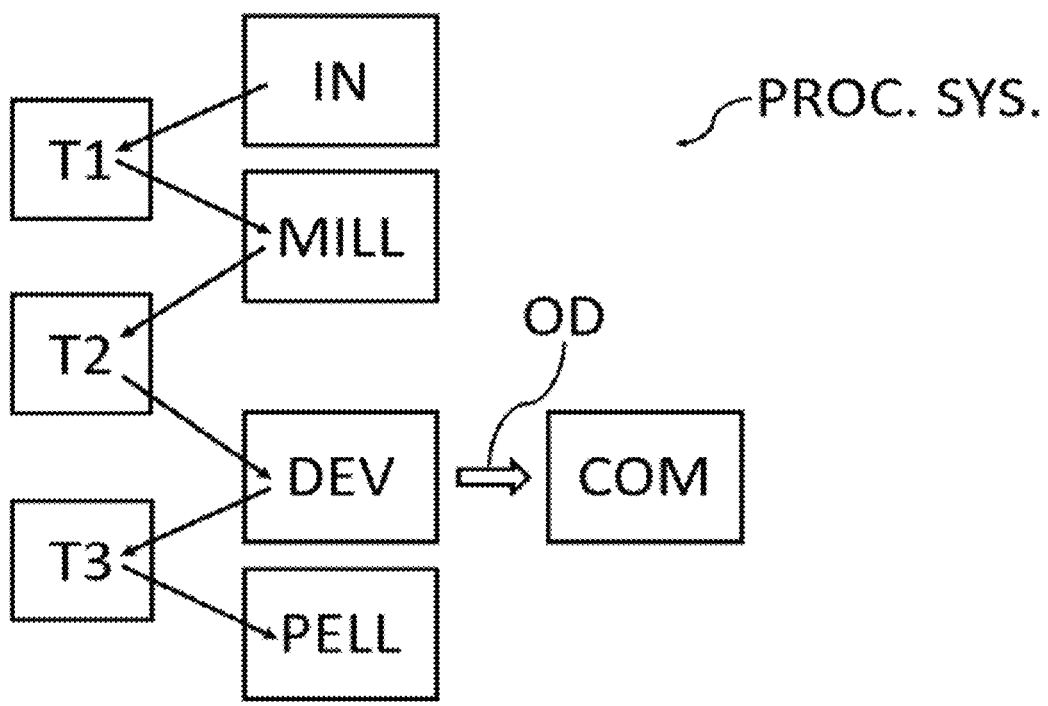
FIG. 8 is a schematic overview of another embodiment of a processing system.

FIG. 8 is a schematic overview of an embodiment of a processing system PROC. SYS. for processing a bulk material, such as processing grain into animal feed. The system PROC. SYS. has an inlet IN for receiving a bulk material, such as grain. From the inlet IN, the bulk material is transferred to a first transporting means T1 so as to transport the bulk material to a mill MILL so as to mill or grind the bulk material into a milled or grinded bulk material. From the mill MILL, the milled or grinded bulk material is transferred back to a second transporting means T2, and transported to a device for determining particle size distribution DEV of said milled or grinded bulk material. The device DEV outputs data OD to a computer COM, said output data OD comprising information regarding the particle size distribution of the milled or grinded bulk material. The milled or grinded bulk material are then transferred from the device DEV to a third transporting means T3, from where the processed bulk material, such as bulk animal feed, can be transported to a pellet processing means PELL so as to press the processed bulk material into pellets, such as pellets suitable for animal feed.

It is to be understood that the device for determining particle size distribution DEV can have one or more motors attached to the sorting devices, so as to either vibrate all sorting devices at the same frequency or vibrate the sorting devices at individual frequencies.

Figure 9:
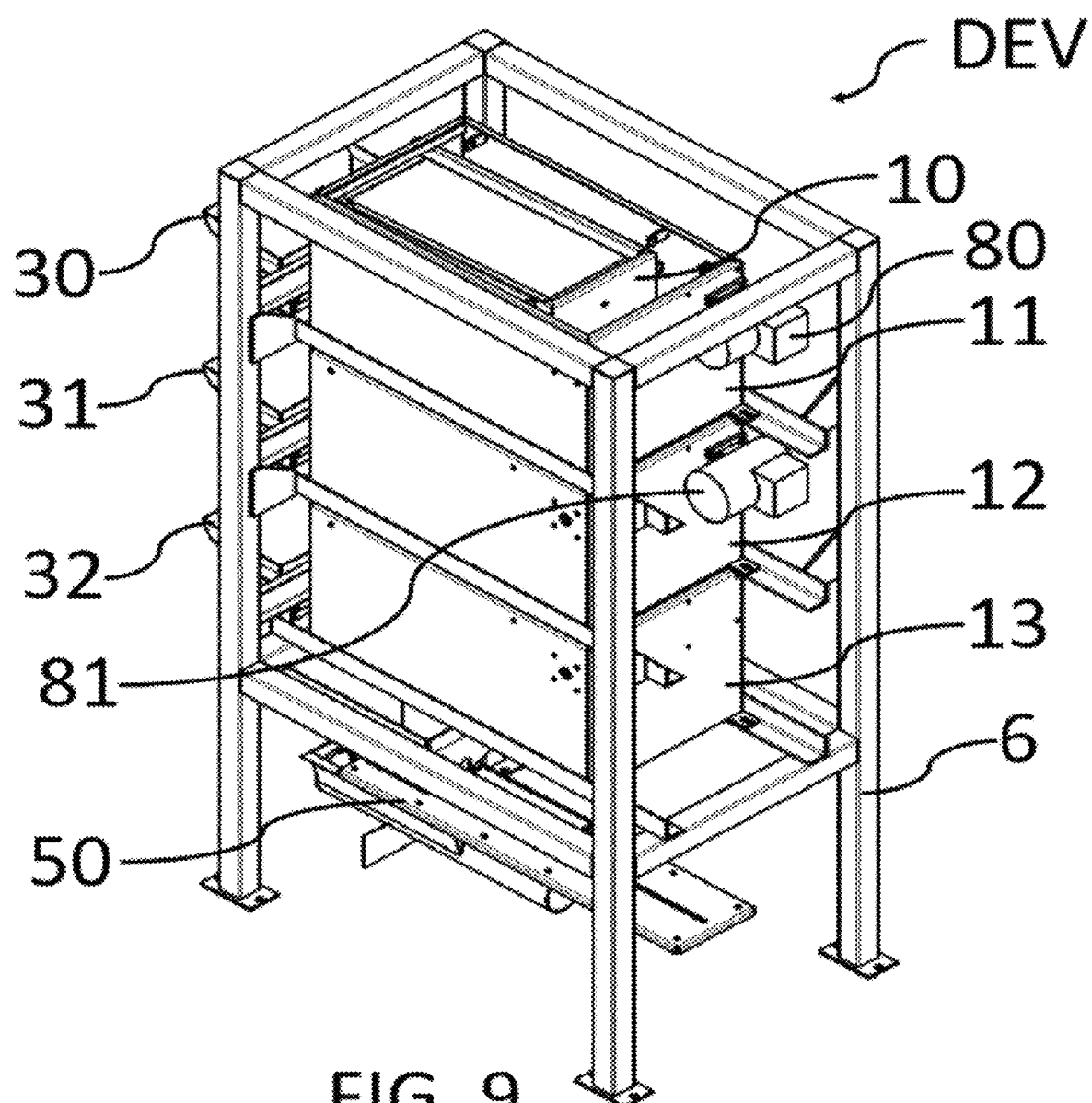
FIG. 9 is an illustration of an embodiment of the device for determining particle size distribution, from a first angle.

FIG. 9 is an illustration of an embodiment of the device for determining particle size distribution DEV, from a first angle. FIG. 9 shows the device DEV built into a frame 6 in a horizontal setup. At the top portion, the first sorting device 10 is positioned. Below the first sorting device 10, at the front portion of the frame 6, the first container 30 is positioned. Below the first sorting device 10, the second sorting device 11 is positioned. A motor 80, is attached to the second sorting device 11 and the frame 6. Said motor 80 is suitable for vibrating one or more of the sorting devices 10, 11, 12, 13. Below the second sorting device 10, at the front portion of the frame 6, the second container 31 is positioned. Below the second sorting device 11, the third sorting device 12 is positioned. A motor 81, is attached to the third sorting device 12 and the frame 6. Said motor 81 is suitable for vibrating one or more of the sorting devices 10, 11, 12, 13. Below the third sorting device 12, at the front portion of the frame 6, the third container 32 is positioned. Below the third sorting device 12, the fourth sorting device 13 is positioned and below said fourth sorting device, the weighing mechanism 50 is positioned.

Figure 10:
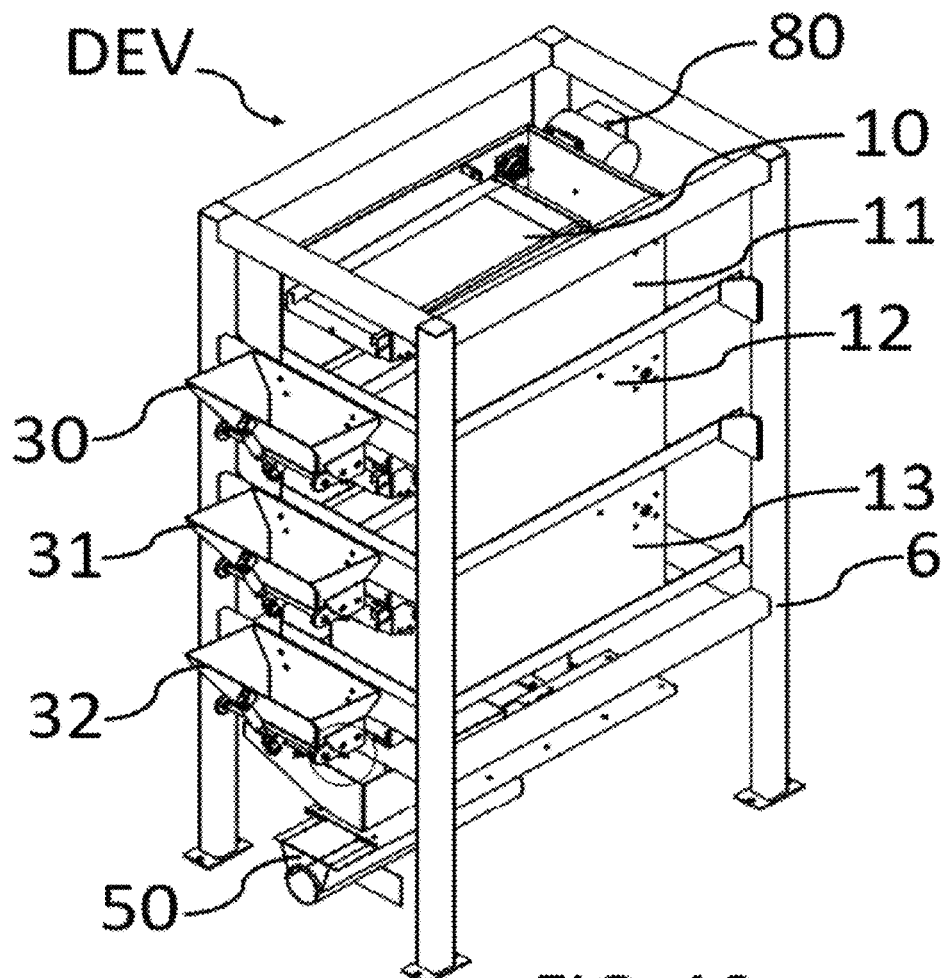
FIG. 10 is an illustration of an embodiment of the device for determining particle size distribution, from a second angle.

FIG. 10 is an illustration of an embodiment of the device for determining particle size distribution DEV, from a second angle. The figure shows the device DEV built into a frame 6 in a horizontal setup. At the top portion, the first sorting device 10 is positioned. Below the first sorting device 10, at the front portion of the frame 6, the first container 30 is positioned. Below the first sorting device 10, the second sorting device 11 is positioned. A motor 80, is attached to the second sorting device 11 and the frame 6. Said motor 80 is suitable for vibrating one or more of the sorting devices 10, 11, 12, 13. Below the second sorting device 10, at the front portion of the frame 6, the second container 31 is positioned. Below the second sorting device 11, the third sorting device 12 is positioned. Below the third sorting device 12, at the front portion of the frame 6, the third container 32 is positioned. Below the third sorting device 12, the fourth sorting device 13 is positioned and below said fourth sorting device, the weighing mechanism 50 is positioned.

Figure 11:
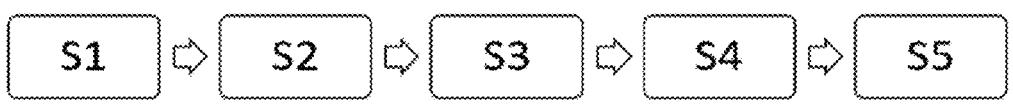
FIG. 11 is a flow-chart of a method according to the invention.

FIG. 11 is a flow chart of a method of measuring particle size distribution in a bulk material, said method comprising the steps of:
S1—receiving at least a portion of the bulk material at an inlet,
S2—sorting the received bulk material with a sorting mechanism, said sorting mechanism comprising:
  at least a first sorting device for sorting said received bulk material into at least two sorted partitions wherein the sorting device are capable of sorting different particle sizes and said at least two sorted partitions have different particle sizes,
  a motor or actuator for vibrating said sorting device,
S3—providing a weighing system comprising at least one sensor for weighing the at least two sorted partitions sorted by said sorting mechanism,
S4—providing data output for generating output data indicative of a weight of the at least two sorted partitions, and
S5—calculating the particle size distribution in the bulk material received in the inlet based on the provided data output.

Figure 12:
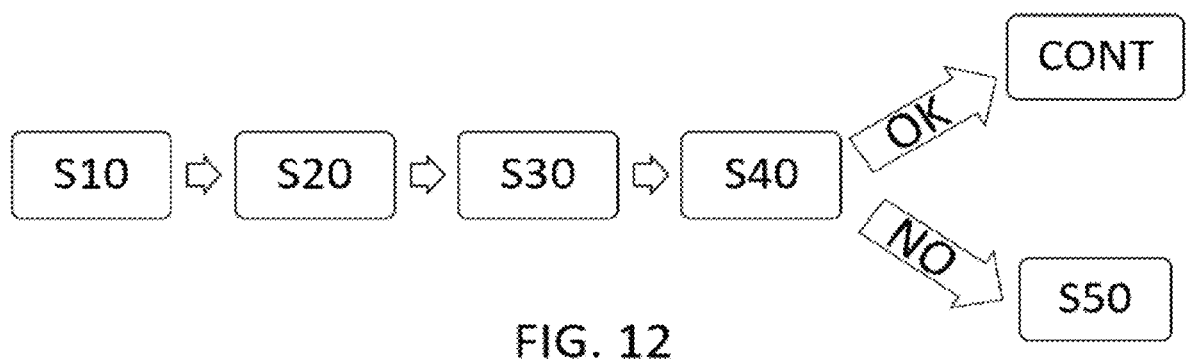
FIG. 12 is another flow-chart of a method according to the invention.

FIG. 12 is a flow chart of a method of controlling a particle size distribution target range of a milled bulk material with a plurality of processing stages, said method comprising:
S10—defining a particle size distribution target range of said milled bulk material,
S20—milling/grinding a bulk material, said bulk material having a first particle size and the milled bulk material having at least a second particle size wherein the at least second particle size is smaller than the first particle size,
S30—transporting the milled bulk material to the device for determining particle size distribution in said milled bulk material according to the first aspect of the invention,
S40—determining the particle size distribution in said milled bulk material, and
  if the particle size distribution in said milled bulk material is within target range OK, to continue CONT milling/grinding of the bulk material, and if the particle size distribution in said milled bulk material is not within target range NO:
S50—adjusting one or more operational parameters of the mill/grinder, based on the particle size distribution data of the milled bulk material relative to the target range of the particle size distribution.

In short, the invention relates to a device for determining particle size distribution in a bulk material, such as milled or grinded grain for animal feed. The device comprises an inlet for receiving at least a portion of the bulk material, a sorting mechanism for sorting the received bulk material. Said sorting mechanism comprises at least a first sorting device for sorting said received bulk material into at least two sorted partitions wherein the sorting device are capable of sorting different particle sizes and said at least two sorted partitions have different particle sizes. The invention further comprises a motor or actuator for vibrating said sorting device, a weighing system with at least one sensor for weighing the at least two sorted partitions sorted by said sorting mechanism and a data output for generating output data indicative of a weight of the at least two sorted partitions, so as to allow calculation of the particle size distribution in the bulk material received in the inlet and thus provide information regarding the particle size composition of the milled or grinded grain.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. An animal feed bulk grain particle size distribution determination device, comprising:
  a sample obtaining device and an inlet,
    the sample obtaining device configured to obtain a sample sub-portion of the animal feed bulk grain, and
    the inlet configured for receiving the sample sub-portion of the animal feed bulk grain,
  a sorting mechanism for sorting the sample sub-portion received by the inlet, said sorting mechanism comprising:
  at least a first sorting device for sorting said sample sub-portion into at least two sorted partitions, wherein the sorting device is configured for sorting different particle sizes and said at least two sorted partitions have different particle sizes, and
  a motor or actuator for vibrating said first sorting device,
  a weighing system comprising at least one sensor for weighing the at least two sorted partitions sorted by said sorting mechanism and a data output for generat- ing output data indicative of a weight of the at least two sorted partitions, so as to allow calculation of the particle size distribution in the animal feed bulk grain.

2. The device according to claim 1, comprising at least a second sorting device wherein the second sorting device receives at least some of the sample sub-portion from the first sorting device.

3. The device according to claim 1, wherein the device is arranged inside a frame or housing comprising a top portion and a bottom portion, the device further being horizontally arranged with the inlet at the top portion, the first sorting device positioned below the inlet for receiving bulk material from the inlet, the device further comprising a second sorting device positioned below the first sorting device for receiving bulk material from the first sorting device and wherein the particle size of the sample sub-portion received in the second sorting device is smaller than the particle size of a sorted partition, sorted by the first sorting device.

4. The device according to claim 1, wherein the sensor of the weighing system is positioned at a bottom portion of the device for determining particle distribution and wherein the sample sub-portion to be sorted is weighed at the bottom portion of the device.

5. The device according to claim 1, further comprising a second sorting device and wherein the at least first sorting device and second sorting device comprise respective first and second sieves, wherein the sample sub-portion is translated from the first sieve to the second sieve through vibration of said first and second sieves, holes of the first sieve being larger than holes of the second sieve, so as to allow particles smaller than the particles kept in the first sieve to translate from the first sieve to the second sieve.

6. The device according to claim 1, further comprising an individual container in connection with the at least first sorting device for receiving the sorted partitions from the at least first sorting device.

7. The device according to claim 6, wherein the at least first sorting device is angled downwards, relative to a horizontal plane, towards the container so as to translate particles kept in the at least first sorting device towards said container through vibration.

8. The device according to claim 7, further comprising a chute positioned below the downwards angled at least first sorting device and wherein said chute is angled downwards, at an angle substantially opposite to the at least first sorting device's angle, relative to a horizontal plane.

9. The device according to claim 1, wherein the weighing system comprises a plurality of weighing sensors for weighing respective ones of the at least two partitions, or wherein the weighing system comprises one single weighing sensor for weighing all of the at least two partitions sequentially.

10. The device according to claim 1, wherein the motor or actuator is arranged to vibrate the first sorting device at between 0.5 and 30 Hz.

11. The device according to claim 1, further comprising imaging means configured to detect anomalies in the animal feed bulk grain.

12. The device according to claim 11, wherein a parameter for detection of anomalies within the animal feed bulk grain is selected from one or more of size, shape, color or reflectance.

13. The device according to claim 1, further comprising a vibration sensor configured to detect vibrations generated by the sample sub-portion during sorting of said sample sub-portion.

14. The device according to claim 1, further comprising a cleaning mechanism for discarding the sorted partitions and cleaning the sorting mechanism.

15. The device of claim 1, further comprising a supply of animal feed bulk grain in communication with sample obtaining device.

16. A processing system comprising
the device according to claim 1, and
a computer system for receiving data from said data output indicative of the weight of the at least two sorted partitions, so as to allow calculation of the particle size distribution in the animal feed bulk grain received in the inlet.

17. The processing system according to claim 16, configured for a target particle size distribution range of a milled animal feed bulk material grain with a plurality of processing stages, said processing system comprising:
a mill or grinder for milling or grinding an animal feed bulk grain, said animal feed bulk grain having a first particle size and the animal feed bulk grain having at least a second particle size wherein the at least second particle size is smaller than the first particle size,
a transporting device for transporting the milled animal feed bulk grain to the device according to claim 1,
wherein the particle size distribution target of the animal feed bulk grain is maintained by, when said particle size distribution is not within said particle size distribution target, adjusting one or more operational parameters of the mill based on a particle size distribution of the animal feed bulk grain and wherein the mill or grinder and the device according to claim 1 are only two of more stages in said processing system.

18. A method of determining an animal feed bulk grain particle size distribution, said method comprising:
obtaining a sample sub-portion of from a supply of animal feed bulk grain;
receiving the sample sub-portion of the animal feed bulk grain at an inlet;
sorting the received sample sub-portion with a sorting mechanism, said sorting mechanism comprising:
(i) at least a first sorting device for sorting said received sample sub-portion into at least two sorted partitions, wherein the sorting device is configured for sorting different particle sizes and said at least two sorted partitions have different particle sizes, and
(ii) a motor or actuator for vibrating at least said first sorting device;
providing a weighing system comprising at least one sensor for weighing the at least two sorted partitions sorted by said first sorting device,
providing data output means for generating output data indicative of a weight of the at least two sorted partitions, and
calculating the particle size distribution in the sample sub-portion received in the inlet based on the provided data output.

19. The method according to claim 18, further comprising:
providing imaging means, and
detecting any anomalies within the animal feed bulk grain before and/or during and/or after sorting of the sample sub-portion.

20. The method according to claim 19, further comprising:
discarding at least a portion of the animal feed bulk grain as a response to the detection of anomalies within said animal feed bulk grain.

21. The method according to claim 19, further comprising:
   outputting a signal as a response to the detection of anomalies within said animal feed bulk grain.

22. A method for producing animal feed from bulk grain, the method comprising
   milling the bulk grain to produce animal feed bulk grain,
   determining particle size distribution of a portion of the animal feed bulk grain according to the method of claim 18, and
   producing an animal feed from the animal feed bulk grain.

23. The method of claim 22, wherein the animal feed comprises pellets.

24. A method for producing animal feed from grain, the method comprising
   milling the grain to produce animal feed bulk grain,
   providing imaging means,
   determining particle size distribution of a portion of the animal feed bulk grain according to the method of claim 18,
   detecting any anomalies within the animal feed bulk grain before and/or during and/or after sorting of the animal feed bulk grain,
   discarding at least a portion of the animal feed bulk grain as a response to the detection of anomalies within said animal feed bulk grain, and
   producing an animal feed from the animal feed bulk grain.

* * * * *